United States Patent
Frank et al.

(10) Patent No.: US 8,642,697 B2
(45) Date of Patent: Feb. 4, 2014

(54) RANDOMLY BRANCHED COPOLYMERS, PREPARATION THEREOF AND USE THEREOF AS LEVELLING AGENTS IN COATING SUBSTANCES

(75) Inventors: Albert Frank, Xanten (DE); René Nagelsdiek, Hamminkeln (DE); Jürgen Omeis, Dorsten-Lembeck (DE); Bernd Göbelt, Wesel (DE); Wojciech Jaunky, Wesel (DE)

(73) Assignee: BYK-Chemie GmbH (DE)

( * ) Notice: Subject to any disclaimer, the term of this patent is extended or adjusted under 35 U.S.C. 154(b) by 108 days.

(21) Appl. No.: 13/390,999

(22) PCT Filed: Jul. 17, 2010

(86) PCT No.: PCT/EP2010/004374
§ 371 (c)(1), (2), (4) Date: Apr. 9, 2012

(87) PCT Pub. No.: WO2011/020533
PCT Pub. Date: Feb. 24, 2011

(65) Prior Publication Data
US 2012/0196975 A1 Aug. 2, 2012

(30) Foreign Application Priority Data
Aug. 20, 2009 (EP) ..................................... 09010729

(51) Int. Cl.
C08F 2/38 (2006.01)
C09D 7/06 (2006.01)

(52) U.S. Cl.
USPC ........... 524/556; 526/213; 526/217; 526/319; 526/328; 526/328.5

(58) Field of Classification Search
USPC ........ 526/213, 217, 319, 328, 328.5; 524/556
See application file for complete search history.

(56) References Cited

U.S. PATENT DOCUMENTS

| 5,735,944 | A | 4/1998 | Haubennestel et al. |
| 5,767,211 | A | 6/1998 | Guan |
| 6,639,032 | B2 | 10/2003 | Wang |
| 7,423,104 | B2 | 9/2008 | Lion |

FOREIGN PATENT DOCUMENTS

| DE | 19522475 C1 | 9/1996 |
| EP | 0 630 943 A2 | 12/1994 |
| EP | 1 193 299 A2 | 4/2002 |
| EP | 1 694 790 A1 | 8/2006 |
| JP | 2000/239334 A | 9/2000 |
| JP | 2002-188059 A | 7/2002 |
| JP | 2007-001804 A | 1/2007 |
| JP | 2008/247978 A | 10/2008 |
| WO | WO-99/46301 A1 | 9/1999 |
| WO | WO-2005/059048 A1 | 6/2005 |
| WO | WO-2008/045299 A1 | 4/2008 |

OTHER PUBLICATIONS

"International Application No. PCT/EP2010/004374, International Preliminary Report on Patentability mailed Nov. 17, 2011", 7 pgs.

"International Application No. PCT/EP2010/004374, International Search Report and Written Opinion mailed Oct. 1, 2010", 14 pgs.

Gao, H., et al., "Synthesis of functional polymers with controlled architecture by CRP of monomers in the presence of cross-linkers: From stars to gels", *Progress in Polymer Science*, 34(4), (2009), 317-350.

Gridnev, A., et al., "Catalytic Chain Transfer in Free-Radical Polymerizations", *Chemical Reviews*, 101(12), (2001), 3611-3660.

Gridnev, A., "The 25th Anniversary of Catalytic Chain Transfer", *Journal of Polymer Science, Part A: Polymer Chemistry*, 38(10), (May, 2000), 1753-1766.

Hawker, C. J., et al., "New Polymer Synthesis by Nitroxide Mediated Living Radical Polymerizations", *Chemical Reviews*, 101(12), (2001), 3661-3688.

Matyjaszewski, K., "Atom Transfer Radical Polymerization", *Chemical Reviews*, 101(9), (2001), 2921-2990.

"International Application No. PCT/EP2010/004374, International Preliminary Report on Patentability mailed Mar. 15, 2012", (Endlish Translation), 7 pgs.

*Primary Examiner* — Vu A Nguyen
(74) *Attorney, Agent, or Firm* — Schwegman, Lundberg & Woessner, P.A.

(57) ABSTRACT

A process for preparing a randomly branched copolymer, by reacting the components (a) 10-98.9 mol % of at least one acrylic ester of a straight-chain, branched or cyclic $C_1$-$C_{22}$-alkyl monoalcohol, (b) 0.1-10 mol % of at least one polyethylenically unsaturated monomer and (c) optionally one or more monoethylenically unsaturated monomers other than acrylic esters of straight-chain, branched or cyclic $C_1$-$C_{22}$-alkyl monoalcohols and other than compounds of the formula (I), in the presence of (d) 1-10 mol % of at least one compound of the formula (I) $H_3C-CR^aR^c-CH_2-CR^a-CH_2$ (I) where $R^a$, $R^b$ are each independently aryl, CN or $COOR^1$ where $R^1$=H, alkyl, aryl or aralkyl, and $R^c$=alkyl, aryl or aralkyl, and is the presence of at least one initiator of free-radical polymerization in a free-radical polymerization, where the stated molar proportions of components (a), (b), (c) and (d) add up to 100 mol %, and where the molar proportion of component (b) does not exceed the molar proportion of component (d), Copolymers obtainable by the process and use thereof as levelling agents in coating substances.

14 Claims, No Drawings

RANDOMLY BRANCHED COPOLYMERS, PREPARATION THEREOF AND USE THEREOF AS LEVELLING AGENTS IN COATING SUBSTANCES

PRIORITY CLAIM TO RELATED APPLICATIONS

This application is a national stage application under 35 U.S.C. §371 of PCT/EP2010/004374, tiled Jul. 17, 2010, and published as WO 2011/020533 A1 on Feb. 24, 2011, which claims priority to European Application No. 09010729.3, tiled Aug. 20, 2009, which applications and publication are incorporated herein by reference and made a part hereof in their entirety, and the benefit of priority of each of which is claimed herein.

The invention relates to randomly branched copolymers, to a process for preparing them and to the use thereof as leveling agents in coating materials. The invention relates more particularly to leveling agents based on irregularly, i.e., randomly branched copolymers of ethylenically unsaturated monomers which are suitable for imparting a uniform surface to coating materials, such as varnishes, for example.

Paint surfaces are normally not entirely smooth, but instead have a more or less structured surface, which is referred to as waviness or else orange-peel structure. These surfaces may be finely structured, with, a short wave, or coarsely structured, with a long wave. In the majority of cases, this waviness is unwanted. There is a relationship between the structure and the type of coating materials, as for example whether these coating materials contain solvents or else are solvent-free, as is the case with powder coating materials. With powder coating materials it is a mandatory necessity to add leveling agents, since without these leveling agents it is not possible to achieve a surface which is to any extent smooth.

It is known that poly(meth)acrylic esters and polysiloxanes can be used as leveling promoters for coatings. The polysiloxanes are usually dimethylpolysiloxanes, methylalkylpolysiloxanes or else polyether- or polyester-modified dimethyl- or methyl-alkylpolysiloxanes. As far as the poly(meth)acrylates are concerned, it is preferred to use polymers or copolymers of acrylic acid alkyl esters having an alkyl radical chain length of $C_2$-$C_8$, such as, for example, ethyl acrylate, 2-ethylhexyl acrylate or else n-butyl acrylate of various molecular weights. The products used in some cases possess molecular weights of up to 100 000 g/mol. These poly(meth)acrylate (co)polymers used as leveling promoters can be employed as such, or as solutions in organic solvents, or else in the form of powders applied, for example, to silica. This is particularly customary in the case of use in powder coatings. The amounts of such products that are used are typically 0.1%-2%, based on the coating formulations.

The effect of all of these products derives from an interface activity at the liquid/gas interface, these products undergoing orientation to the interface on account of a certain incompatibility with the actual binder of the coating system. This incompatibility can be increased by raising the molecular weight of these polymers. A disadvantage then, however, is that this incompatibility may cause a certain haze of the coating to occur, and the viscosity of the leveling agent becomes so high that easy handling is difficult, if not impossible, for the user. One approach at solving this problem is the use of comb copolymers, composed primarily of (meth) acrylic esters and copolymerizable macromonomers. EP 1 193 299 describes the use of these comb copolymers as leveling agents. The disadvantage of these comb copolymers is the awkward multistage preparation process and the availability of the required macromonomers in industrial quantities. In certain cases a result of this is that the leveling agents cannot be tailored optimally in terms of their polarity to the coating material and hence that the optimum leveling effect is not achieved. Furthermore, the preparation of the macromonomers is very expensive, and so an alternative is needed from the standpoint of price as well.

PROBLEM

The problem addressed was therefore that of providing copolymers which can be prepared in a simple process and in a wide spectrum with good availability of the raw materials. The copolymers are to be able to be used as leveling agents in coating materials, making it possible to generate very smooth and as far as possible haze-free coatings, this being of the utmost importance particularly in powder coatings.

SOLUTION

Surprisingly it has been found that this problem can be solved by a process for preparing a randomly branched copolymer, in which the components
(a) 10-98.9 mol % of at least one acrylic ester of a linear, branched or cyclic $C_1$-$C_{22}$ alkyl monoalcohol,
(b) 0.1-10 mol % of at least one polyethylenically unsaturated monomer, and
(c) optionally one or more monoethylenically unsaturated monomers which are different from acrylic esters of linear, branched or cyclic $C_1$-$C_{22}$ alkyl monoalcohols and from compounds of the formula (I),
in the presence of
(d) 1-10 mol % of at least one compound of the formula (I)

$$H_3C-CR^aR^c-CH_2-CR^b=CH_2 \quad (I)$$

where $R^a$ and $R^b$ independently of one another are aryl, CN or $COOR^1$ with $R^1$=H, alkyl, aryl or aralkyl and $R^c$=alkyl, aryl or aralkyl, and in the presence of at least one initiator of free-radical polymerization, are reacted in a free-radical polymerization, the stated molar fractions of components (a), (b), (c), and (d) adding up to 100 mol % and the molar fraction of component (b) not exceeding the molar fraction of component (d).

Randomly branched copolymers obtained by this process can be used as leveling agents in coating materials, including, in particular, in powder coating materials, thereby making it possible to generate coatings which are very smooth and as far as possible free from haze. The preparation process is a simple one-stage process which allows the uncomplicated preparation of a relatively wide spectrum of copolymers from readily available starting materials.

The preparation of highly branched copolymers by means of free-radical polymerization is described in various technical articles, such as in the review article Progress in Polymer Science 34 (2009), 317, or in U.S. Pat. No. 7,423,104.

For example, one preparation variant for highly branched copolymers is that of "self-condensing vinyl polymerization" (SCVP) with AB* monomers, which are ethylenically unsaturated monomers which carry a group which under the prevailing polymerization conditions acts as a free-radical initiator and is chain-extended. This approach is described in Chem. Rev. 2001, 101, page 3681 ff. for *Nitroxyl Mediated Polymerization (NMP)* and in Chem. Rev. 2001, 101, page 2981 ff. for *Atom Transfer Radical Polymerization (ATRP)*, WO 2008/045299 or in U.S. Pat. No. 6,639,032. These review articles also identify examples of AB* monomers.

Another synthesis strategy for highly branched polymers is described in Chem. Rev. 2001, 101, page 3643 ff. and J. Polym Sci. Part A, 2000, 38, 1764 ff. It has been discovered that highly branched polymers are synthesized under certain circumstances in *Catalytic Chain Transfer (CCT)*—and in *Reversible Addition Fragmentation Chain Transfer Polymerization*. The generation of branches can be regarded as the polymerization of macromonomers generated in situ. This does not produce comb copolymers with a main chain and side chains, but instead, as a result of the fact that a macromonomer generated in situ can be polymerized at any point in time during the polymerization, the side chains may in turn be branched. U.S. Pat. No. 5,767,211 describes the preparation of highly branched polymers from di- or trifunctional monomers with monofunctional monomers in the presence of a cobalt catalyst by means of CCT.

EP 1 694 790 describes the use of copolymers of mono- and polyethylenically unsaturated monomers, prepared with NMP, as leveling agents.

Patent JP 2000/239334 describes the preparation of a star copolymer in a two-stage operation by means of α-methylstyrene dimer and polyfunctional monomers.

WO 99/46301 describes the preparation of branched polymers from mono- and polyfunctional ethylenically unsaturated monomers with the aid of chain transfer compounds which lower the molecular weight.

JP 2008/247978 shows a synthesis path to branched polymers which still carry ethylenically unsaturated groups for being crosslinked into the curing binder matrix. The presence of ethylenically unsaturated groups in the leveling agent is undesirable, since as a result of being crosslinked into the curing binder they are no longer able to rise to the interface with the air.

DETAILED DESCRIPTION

In the process of the invention the components
(a) 10-98.9 mol % of at least one acrylic ester of a linear, branched or cyclic $C_1$-$C_{22}$ alkyl monoalcohol,
(b) 0.1-10 mol % of at least one polyethylenically unsaturated monomer, and
(c) optionally one or more monoethylenically unsaturated monomers which are different from acrylic esters of linear, branched or cyclic $C_1$-$C_{22}$ alkyl monoalcohols and from compounds of the formula (I),
in the presence of
(d) 1-10 mol % of at least one compound of the formula (I)

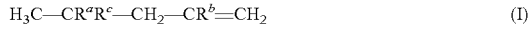

$$H_3C\text{—}CR^aR^c\text{—}CH_2\text{—}CR^b\text{=}CH_2 \qquad (I)$$

where $R^a$ and $R^b$ independently of one another are aryl, CN or $COOR^1$ with $R^1$=H, alkyl, aryl or aralkyl and $R^c$=alkyl, aryl or aralkyl,
and in the presence of at least one initiator of free-radical polymerization, are reacted in a free-radical polymerization, the stated molar fractions of components (a), (b), (c), and (d) adding up to 100 mol % and the molar fraction of component (b) not exceeding the molar fraction of component (d).

The molar fraction of component (a) is preferably 25-98.8 mol %, more preferably 40-98.8 mol %, based in each case on the sum of components (a), (b), (c), and (d) used.

The molar fraction of component (b) is preferably 0.1-5 mol %, based on the sum of components (a), (b), (c), and (d) used.

Component (c) is present only optionally, i.e., the molar fraction of component (c) can be 0 mol %. The molar fraction of component (c) is preferably 0.1-50 mol %, based on the sum of components (a), (b), (c), and (d) used.

The molar fraction of component (d) is preferably 1-5 mol %, based on the sum of components (a), (b), (c), and (d) used.

Used as component (a) is at least one acrylic ester of a linear, branched or cyclic $C_1$-$C_{22}$ alkyl monoalcohol. Esters of methacrylic acid are expressly excluded. The linear, branched or cyclic $C_1$-$C_{22}$ alkyl monoalcohols that are used for esterifying the acrylic acid are aliphatic, saturated and monohydroxy-functional, and apart from the hydroxyl group carry no further functional groups. Examples of the acrylic esters of linear, branched, or cyclic $C_1$-$C_{22}$ alkyl mono alcohols of component (a) are methyl acrylate, ethyl acrylate, n-propyl acrylate, n-butyl acrylate, isobutyl acrylate, hexyl acrylate, cyclohexyl acrylate, 2-ethylhexyl acrylate, lauryl acrylate, stearyl acrylate, and behenyl acrylate.

Used as component (b) is at least one polyethylenically unsaturated monomer. Polyethylenically unsaturated monomers of component (b) carry two or more ethylenically unsaturated groups, preferably two or three ethylenically unsaturated groups, more preferably two ethylenically unsaturated groups. Examples of polyunsaturated monomers are divinylbenzene, N,N'-bisacryloyl-1,2-diaminoethane, ethylene glycol dimethacrylate, ethylene glycol diacrylate, 1,6-hexanediol diacrylate, trimethylolpropane trimethacrylate, polyethyleneglycoldiacrylate, polyethyleneglycol dimethacrylate, polypropylene glycol diacrylate, polypropylene glycol dimethacrylate, or polydimethylsiloxanes functionalized with acrylate or methacrylate groups.

Used as component (c), optionally, are one or more monoethylenically unsaturated monomers which are different from acrylic esters of linear, branched or cyclic $C_1$-$C_{22}$ alkyl monoalcohols and from compounds of the formula (I). Examples of monomers of component (c) are (here, the notation "(meth)acrylate" includes acrylates and methacrylates):

methacrylic esters of linear or branched alcohols having 1 to 22 C atoms such as methyl methacrylate, ethyl methacrylate, n-butyl and isobutyl methacrylate, lauryl methacrylate, 2-ethylhexyl methacrylate, stearyl methacrylate, behenyl methacrylate; cycloaliphatic methacrylates such as, for example, cyclohexyl methacrylate and isobornyl methacrylate; aralkyl (meth) acrylates such as, for example, benzyl (meth)acrylate; itaconic esters and maleic esters with aforementioned alkyl, cycloalkyl or aralkyl groups.

As functional monomers of component (c) it is possible for example to use hydroxy-functional or carboxy-functional monomers, examples being monoethylenically unsaturated polyesters of (meth)acrylic acid and caprolactone. In order to allow crosslinking of the resulting hydroxy-functional leveling agents with, for example, acrylic-melamine formaldehyde resins, it is also possible for some or all of these hydroxyl groups to be reacted with isocyanates to form, secondary carbamate groups, so that, in the crosslinking of the overall system, sufficient time remains for the leveling agent to orient itself at the interface, to develop its effect there, and, after a certain time delay, to react with the melamine-formaldehyde resin.

Further examples of functional monomers of component (c) include the following:

acrylic acid, methacrylic acid, maleic acid, maleic anhydride, fumaric acid, and itaconic acid;

hydroxyalkyl (meth)acrylates of linear, branched or cycloaliphatic diols having 2 to 36 C atoms, such as, for example, 3-hydroxypropyl methacrylate, 3,4-dihydroxybutyl methacrylate, 2-hydroxyethyl (meth)-acrylate, 4-hydroxybutyl (meth)acrylate, 2-hydroxypropyl methacrylate, 2,5-dimethyl-1,6-hexanediol monomethacrylate;

(meth)acrylates of ethers, polyethylene glycols, polypropylene glycols or mixed polyethylene/propylene glycols having 5 to 80 C atoms, such as, for example, tetrahydrofurfuryl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, 1-ethoxybutyl methacrylate, methoxymethyl methacrylate, 1-ethoxyethyl methacrylate, ethoxymethyl methacrylate, poly(ethylene glycol) methyl ether (meth)acrylate, poly(propylene glycol)methyl ether(meth)acrylate;

glycidoxypropyl methacrylate;

caprolactone- and/or valerolactone-modified hydroxyalkyl (meth)acrylates having an average molecular weight of 2.20 to 12.00 g/mol, the hydroxy (meth)acrylates being derived preferably from linear, branched or cycloaliphatic diols having 2 to 8 C atoms; and also other monoethylenically unsaturated monomers suitable for copolymerization, e.g., styrene, α-methylstyrene, acrylonitrile, and vinyl ethers such as ethyl vinyl ether, butyl vinyl ether, and cyclohexyl vinyl ether.

In order drastically to lower the surface tension of the copolymers it is advantageous to include in the copolymerization small fractions of a perfluoroalkyl (meth)acrylate or polydimethylsiloxane which is functionalized with an acrylate or methacrylate group, or of a reaction product of perfluoroalkyl alcohols with maleic acid, maleic anhydride or fumaric acid.

The abovementioned ethylenically unsaturated monomers may be polymerized individually or in combination, depending on the desired binder compatibility.

The polymers copolymerized with polyalkoxylated monomers or with (meth)acrylic acid can be used in aqueous binder systems as leveling agents. In the case of the acidically modified products it is particularly advisable to salify them, prior to use with suitable amines such as triethylamine, dimethylethanolamine or aminomethylpropanol, for example.

Used as component (d) is at least one compound of the formula (I)

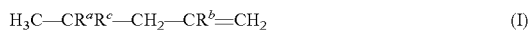

$$H_3C-CR^aR^c-CH_2-CR^b=CH_2 \qquad (I)$$

where $R^a$ and $R^b$ independently of one another=aryl, CN or COOR$^1$ with R$^1$=H, alkyl, aryl or aralkyl, and $R^c$=alkyl, aryl or aralkyl.

Examples of compounds of the formula (I) are 2,4-dicyanopent-1-ene, 2,4-dicyano-4-methylpent-1-ene, 2,4-diphenyl-4-methylpent-1-ene, 2-cyano-4-methyl-4-phenyl-pent-1-ene, dimethyl 2,2-dimethyl-4-methylenepentane-1,5-dioate and dibutyl 2,2-dimethyl-4-methylenepentane-1,5-dioate. In component (d) it is preferred to use 2,4-diphenyl-4-methylpent-1-ene.

The preparation of the randomly branched polymers by free-radical polymerization takes place in the presence of at least one initiator of free-radical polymerization, such as, for example, peroxides or azo compounds, in a manner known to the skilled person. Solvents contemplated include, in particular, esters such as ethyl acetate, n-butyl acetate or 1-methoxy-2-propyl acetate, for example, and also aromatic solvents, such as toluene or xylene, for example, and ketones, such as methyl isobutyl ketone or methyl ethyl ketone, for example. The choice of the solvent or of the solvent mixture is also guided by the subsequent intended use of the polymer of the invention. It is preferred to use low-boiling solvents, in order to facilitate the distillative removal of these solvents in those applications where the polymers of the invention are to be used as a 100% product, such as in UV-curing paint systems or in polymers, for example.

The free-radical polymerization is carried out at temperatures of about 40° C. to 200° C., preferably at 60° C. to 180° C., more preferably at 80° C. to 160° C.

The free-radical polymerization can be carried out, for example, as a bulk polymerization, a solution polymerization, a precipitation polymerization, an emulsion polymerization or a suspension polymerization.

The polymers are prepared in a one-stage process in which either the monomers of components (a), (b), and optionally (c), the at least one initiator, and the compound(s) of component (d) are jointly metered in or the compound (s) of component (d) are introduced as an initial charge and a mixture of the monomers of components (a), (b), and optionally (c) and the at least one initiator are metered in. This produces copolymers having a random constitution. A random constitution means a constitution of the polymer featuring an irregular, random sequence of monomer units, which differs from a block constitution, a grafted constitution, and an alternating constitution. In particular, the branching points are distributed randomly in the copolymer. Accordingly, a randomly-branched copolymer is formed in a one-stage process.

The invention additionally provides randomly branched copolymers obtainable by the process described.

The number-average molecular weight of the copolymers of the invention is situated in the range from 1500 to 200 000 g/mol, preferably 5000 to 75 000 g/mol, more preferably in the range from. 7500 to 50 000 g/mol. The number-average molecular weight of the copolymers is determined by means of gel permeation chromatography with tetrahydrofuran (1 ml/min) as eluent, using polystyrene standards.

The copolymers can be modified subsequently by means of polymer-analogous reactions. For example, through the subsequent reaction with maleic anhydride it is possible to incorporate a reactive double bond and acid function as well. This acid function may also be salified with triethanolamine, for example, for improved water-solubility. It is also possible for free OH groups to be esterified by means, for example, of subsequent reaction with acetic anhydride, in order to allow more effective avoidance of potential intercoat adhesion problems where the polymers of the invention are employed as leveling assistants in varnishes.

Additionally provided by the invention is the use of an above-described copolymer as a leveling agent in a coating material. The invention further provides a coating material which comprises a copolymer of the invention. The invention further provides a leveling agent which comprises a copolymer of the invention and is intended for addition in a coating material. In these cases, in addition to the leveling promotion effect, the leveling agent may also influence other surface properties of the coating composition, such as, for example, giving the surface of the coating material hydrophobic, hyddrophilic, scratch resistance, antiadhesive or dirt repellency qualities, or increasing the slip (surface smoothness).

Coating materials are liquid, paste or powder products which when applied to a substrate produce a coating having protective, decorative and/or other specific properties; more particularly they are paints and varnishes. Examples of coating materials are, in particular, pigmented and unpigmented varnishes, which may comprise organic solvents and/or water or may be free from them (powder coating materials). With particular preference the coating materials are powder coating materials, i.e., coating materials in powder form.

Leveling agents are solutions, emulsions, 100% formulations or other formulations of substances which enhance the flow behavior of a coating material on a substrate. The leveling agents of the invention may comprise not only the copolymer or copolymers of the invention but also, in particular, one or more additives selected from, the group consisting of organic solvents, water, inorganic carriers, preservatives, and emulsifiers.

For the use of the copolymers described for improving leveling in a coating material, the copolymers are used in the coating material in relatively small amounts of 0.01% to 5% by weight, preferably 0.05% to 2% by weight, very preferably 0.1% to 1% by weight, based in each, case on the total coating material. The copolymers may be used in the form, of the leveling agent as solutions, emulsions, another formulation or else as 100% substances, depending on the nature and mode of application of the coating material. In solvent borne varnishes it is preferred to use leveling agents which are in dilution in solvents similar to those of the varnishes themselves. In radiation-curing systems, the leveling agents are preferably diluted in corresponding monomers. In powder coating materials, preference is given to a 100% version of the leveling agent or to a form of these leveling agents which is applied to pulverulent carrier material. These leveling agents can also be incorporated into wax melts, in accordance with German patent specification 19 522 475, and in that way converted into free-flowing solid forms, if the leveling agents of the invention constitute viscous tacky resins. In aqueous powder slurries, a modification of the powder coating, the leveling agents may be added as an aqueous emulsion. These emulsions are prepared, in accordance with the prior art, with the aid of emulsifiers.

EXAMPLES

Preparation of the Inventive Polymers

Example 1

A glass flask fitted with stirrer, thermometer, reflux condenser, dropping funnel, and nitrogen inlet tube is charged with 100 g of isobutanol. Nitrogen is passed over the contents throughout the reaction. After the reaction temperature has been increased to 110° C., a mixture of 7.6 g of 2,2'-azodi(2-methylbutyronitrile), 9.3 g of 2,4-diphenyl-4-methylpent-1-ene, 151.6 g of n-butyl acrylate, 28.5 g of acrylic acid, and 4.7 g of tripropylene glycol diacrylate is metered in at a uniform rate over the course of a period of 150 minutes. After the end of the addition, the reaction temperature is maintained at 110° C. for 120 minutes more. Thereafter three times 0.5 g of 2,2'-azodi (2-methylbutyronitrile) are added at 30-minute intervals. After the end of the addition, the reaction temperature is maintained at 110° C. for 120 minutes more.

Subsequently the solvent used is removed by distillation under vacuum on a rotary evaporator. The solids is >98%.

Example 2

A glass flask fitted with stirrer, thermometer, reflux condenser, dropping funnel, and nitrogen inlet tube is charged with 100 g of isobutanol. Nitrogen is passed over the contents throughout the reaction. After the reaction temperature has been increased to 110° C., a mixture of 7.6 g of 2,2'-azodi(2-methylbutyronitrile), 18.6 g of 2,4-diphenyl-4-methylpent-1-ene, 151.6 g of n-butyl acrylate, 28.5 g of acrylic acid, and 4.7 g of tripropylene glycol diacrylate is metered in at a uniform rate over the course of a period of 150 minutes. After the end of the addition, the reaction temperature is maintained at 110° C. for 120 minutes more. Thereafter three times 0.5 g of 2,2'-azodi(2-methylbutyronitrile) are added at 30-minute intervals. After the end of the addition, the reaction temperature is maintained at 110° C. for 12.0 minutes more.

Subsequently the solvent used is removed by distillation under vacuum on a rotary evaporator. The solids is >98%.

Example 3

A glass flask fitted with stirrer, thermometer, reflux condenser, dropping funnel, and nitrogen inlet tube is charged with 5 g of 2,4-diphenyl-4-methylpent-1-ene and 41.6 g of 1-methoxy-2-propyl acetate. Nitrogen is passed over the contents throughout the reaction. After the reaction temperature has been raised to 120° C., a mixture of 4 g of 2,2'-azodi(2-methylbutyronitrile), 51.6 g of n-butyl acrylate, and 1.6 g of 1,6-hexanediol diacrylate is metered in at a uniform rate over the course of a period of 120 minutes. After the end of the addition, the reaction temperature is maintained at 120° C. for 120 minutes more. The solids is 60%.

Example 4

A glass flask fitted with stirrer, thermometer, fractionating column, dropping funnel, and nitrogen inlet tube is charged with 5 g of 2,4-diphenyl-4-methylpent-1-ene and 41.6 g of 1-methoxy-2-propyl acetate. Nitrogen is passed over the contents throughout the reaction. After the reaction temperature has been raised to 120° C., a mixture of 4 g of 2,2'-azodi(2-methylbutyronitrile), 25.8 g of n-butyl acrylate, 25.8 g of isobutyl acrylate, and 1.6 g of 1,6-hexanediol diacrylate is metered in at a uniform rate over the course of a period of 120 minutes. After the end of the addition, the reaction temperature is maintained at 120° C. for 120 minutes more. The solids is 60%.

Example 5

A glass flask fitted with stirrer, thermometer, reflux condenser, dropping funnel, and nitrogen inlet tube is charged with 100 g of isobutanol. Nitrogen is passed over the contents throughout the reaction. After the reaction temperature has been increased to 110° C., a mixture of 1.2 g of 2,2'-azodi(2-methylbutyronitrile), 3 g of 2,4-diphenyl-4-methylpent-1-ene, 74.8 g of 2-ethylhexyl acrylate, 103 g of BISOMER® MPEG550MA (monomethyl polyethylene glycol ester of methacrylic acid, from Cognis, having a number-average molecular weight of 628 g/mol), 2.25 g of acrylic acid, and 0.6 g of tripropylene glycol diacrylate is metered in at a uniform rate over the course of a period of 180 minutes. After the end of the addition, the reaction temperature is maintained at 110° C. for 120 minutes more. Thereafter three times 0.5 g of 2,2'-azodi(2-methylbutyronitrile) are added at 30-minute intervals. After the end of the addition, the reaction temperature is maintained at 110° C. for 120 minutes more.

Subsequently the solvent used is removed by distillation under vacuum, on a rotary evaporator. The solids is >98%.

Example 6

A glass flask fitted with stirrer, thermometer, reflux condenser, dropping funnel, and nitrogen inlet tube is charged with 5 g of 2,4-diphenyl-4-methylpent-1-ene and 41.6 g of 1-methoxy-2-propyl acetate. Nitrogen is passed over the contents throughout the reaction. After the reaction temperature has been raised to 120° C., a mixture of 4 g of 2,2'-azodi(2-methylbutyronitrile), 51.6 g of n-butyl acrylate, and 10 g of diacrylate-functionalized polydimethylsiloxane AB 172305 (manufacturer: ABCR, $M_n$=about 1400 g/mol) is metered in at a uniform rate over the course of a period of 120 minutes.

After the end of the addition, the reaction temperature is maintained at 120° C. for 120 minutes more.

The solids is 60%.

Comparative Polymers

Comparative 1 (without Components (b) and (d))

A glass flask fitted with stirrer, thermometer, reflux condenser, dropping funnel, and nitrogen inlet tube is charged with 100 g of isobutanol. Nitrogen is passed over the contents throughout the reaction. After the reaction temperature has been increased to 110° C., a mixture of 7.6 g of 2,2'-azodi(2-methylbutyronitrile), 151.6 g of n-butyl acrylate, and 28.5 g of acrylic acid is metered in at a uniform rate over the course of a period of 150 minutes. After the end of the addition, the reaction temperature is maintained at 110° C. for 270 minutes more. Thereafter three times 0.5 g of 2,2'-azodi(2-methylbutyronitrile) are added at 30-minute intervals. After the end of the addition, the reaction temperature is maintained at 110° C. for 120 minutes more.

Subsequently the solvent used is removed by distillation under vacuum on a rotary evaporator. The solids is >98%.

Comparative 2 (With Component (d), Without Component (b))

A glass flask fitted with stirrer, thermometer, reflux condenser, dropping funnel, and nitrogen inlet tube is charged with 100 g of isobutanol. Nitrogen is passed over the contents throughout the reaction. After the reaction temperature has been increased to 110° C., a mixture of 7.6 g of 2,2'-azodi(2-methylbutyronitrile), 9.3 g of 2,4-diphenyl-4-methylpent-1-ene, 151.6 g of n-butyl acrylate, and 28.5 g of acrylic acid is metered in at a uniform rate over the course of a period of 150 minutes. After the end of the addition, the reaction temperature is maintained at 110° C. for 270 minutes more. Thereafter three times 0.5 g of 2,2'-azodi(2-methylbutyronitrile) are added at 30-minute intervals. After the end of the addition, the reaction temperature is maintained at 110° C. for 120 minutes more.

Subsequently the solvent used is removed by distillation under vacuum on a rotary evaporator. The solids is >98%.

Comparative 3 (Without Components (b) and (d))

A glass flask fitted with stirrer, thermometer, reflux condenser, dropping funnel, and nitrogen inlet tube is charged with 119 g of isobutanol. Nitrogen is passed over the contents throughout the reaction. After the reaction temperature has been increased to 110° C., a mixture of 1.2 g of 2,2'-azodi(2-methylbutyronitrile), 74.8 g of 2-ethylhexyl acrylate, 103 g of BISOMER® MPEG550MA, and 2.25 g of acrylic acid is metered in at a uniform rate over the course of a period of 180 minutes. After the end of the addition, the reaction temperature is maintained at 110° C. for 120 minutes more. Thereafter three times 0.1 g of 2,2'-azodi(2-methylbutyronitrile) are added at 30-minute intervals. After the end of the addition, the reaction temperature is maintained at 110° C. for 120 minutes more.

Subsequently the solvent used is removed by distillation under vacuum on a rotary evaporator. The solids is >98%.

Comparative 4 (With Component (d), Without Component (b))

A glass flask fitted, with stirrer, thermometer, reflux condenser, dropping funnel, and nitrogen inlet tube is charged with 118 g of isobutanol. Nitrogen is passed over the contents throughout the reaction. After the reaction temperature has been increased to 110° C., a mixture of 1.2 g of 2,2'-azodi(2-methylbutyronitrile), 1.5 g of 2,4-diphenyl-4-methylpent-1-ene, 74,8 g of 2-ethylhexyl acrylate, 103 g of BISOMER® MPEG550MA, and 2.25 g of acrylic acid is metered in at a uniform rate over the course of a period of 180 minutes. After the end of the addition, the reaction temperature is maintained at 110° C. for 120 minutes more. Thereafter three times 0.5 g of 2,2'-azodi(2-methylbutyronitrile) are added at 30-minute intervals. After the end of the addition, the reaction temperature is maintained at 110° C. for 120 minutes more.

Subsequently the solvent used is removed by distillation under vacuum on a rotary evaporator. The solids is >98%.

Comparative 5 (linear polymer):

Acronal 4F=poly-n-butyl acrylate, BASF, Ludwigshafen (DE)

Comparative 6 (comb copolymer):

example 10 from EP 1 193 299 A2.

Use as Leveling Agents in Coating Materials

1. Aqueous Polyurethane Dispersion Varnish

| Liopur 2004-119 | 34.70 g | Polyurethane dispersion, manufacturer: Synthopol |
| --- | --- | --- |
| BYK 425 (10% in water) | 0.30 g | Rheology control agent, manufacturer: Byk |
| Water | 6.65 g | |
| Butyl glycol | 5.95 g | |
| BYK-093 | 0.40 g | Defoamer, manufacturer: Byk |
| Liocryl AS-680 | 52.00 g | Styrene-acrylate dispersion from Synthopol |
| | 100.00 g | |

The varnishes were prepared and the leveling agents (see table below) were incorporated in 3 minutes with a dissolver (1865 rpm). Following storage of the varnishes for 2.4 hours, the following tests were conducted:

brush application to sealed contrast charts (chart 2813) and visual assessment of foam and leveling,

| | Amount | Testing | |
| --- | --- | --- | --- |
| Leveling agent | [g] | Foam* | Leveling** |
| No leveling agent | — | 2 | 5 |
| Comparative 1 | 0.1 | 2 | 4 |
| Comparative 2 | 0.1 | 2 | 4 |
| Example 1 | 0.1 | 1-2 | 4 |
| Example 2 | 0.1 | 1-2 | 1 |

*1 = no foam; 5 = copious foam;
**1 = good leveling; 5 = poor leveling

2. Aqueous Polyacrylata Dispersion Varnish

| Joncryl 8226 | 89.70 g | Aqueous polyacrylate emulsion (BASF) |
| --- | --- | --- |
| BYK-425 (10% in water) | 0.50 g | |
| Dowanol PnB | 1.80 g | Butoxypropanol, manufacturer: Dow |
| Texanol | 3.50 g | Coalescent, manufacturer: Eastman |
| Water | 4.10 g | |
| BYK-028 | 0.40 g | Defoamer, manufacturer: Byk Chemie |
| | 100.00 g | |

The varnishes were prepared and the leveling agents (see table below) were incorporated in 3 minutes with a dissolver (1865 rpm). Following storage of the varnishes for 24 hours, the following tests were conducted:

brush application to sealed contrast charts (chart 2813) and visual assessment of foam and leveling.

| Leveling agent | Amount [g] | Testing Foam* | Leveling** |
|---|---|---|---|
| No leveling agent | — | 2 | 4 |
| Comparative 1 | 0.1 | 2 | 5 |
| Example 2 | 0.1 | 1 | 2 |

*1 = no foam; 5 = copious foam;
**1 = good leveling; 5 = poor leveling

3. Solvantborne White Polyester/Melamine Baking Varnish

| Mill-base | | |
|---|---|---|
| Uralac SN 831 | 16.7 g | Polyester binder, manufacturer: DSM |
| Methoxypropyl acetate | 5 g | |
| Disperbyk 174 | 0.9 g | Wetting and dispersing agent, manufacturer: Byk |
| Byk-057 | 0.5 g | Defoamer, manufacturer: Byk |
| Aerosil R972 | 0.3 g | Fumed silica, manufacturer: Degussa |
| TI-pure R 960 | 30 g | Titanium dioxide, manufacturer: DuPont |

Dispersing: Dispermat CV; 20 min; 8000 rpm; 40° C.; millbase:glass beads 1:1

| Let-down | | |
|---|---|---|
| Uralac SN 831 | 33.3 g | |
| Cymel 303 | 7.5 g | Melamine derivative, manufacturer: Cytec |
| Dynapol Catalyst 1203 | 1.9 g | Blocked sulfonic acid derivative (Evonik) |
| Solvesso 150 | 2.1 g | Solvent, manufacturer: ExxonMobil |
| Butyldiglycol acetate | 1.8 g | |

Copolymer/leveling agent 0.3 or 0.7 g as per table below, calculated in each case relative to the solids of the leveling agent (i.e., the amount of leveling agent used was selected such that it contained 0.3 or 0.7 g of the copolymer, respectively).

The mill-base and the let-down are mixed and homogenized for 5 minutes.

The viscosity was adjusted using Solvesso 150 to 100-120s with DIN 4 cup.

After 2.4 hours, the varnish is applied using a wire doctor to primer-coated aluminum panels in a wet film thickness of 80 μm and baked for 30 minutes with a PMT (Peak Metal Temperature) at 232° C.

Visual Assessment of Leveling:

| Leveling agent | Amount [g] | Leveling* | Craters** | Gloss/haze 60°/20°/Haze |
|---|---|---|---|---|
| No leveling agent | — | 5 | 4 | 94/49/455 |
| Comparative 3 | 0.3 | 3-4 | 3 | 98/85/111 |
| | 0.7 | 3-4 | 2 | 98/81/152 |
| Comparative 4 | 0.3 | 2-3 | 2 | 98/87/91 |
| | 0.7 | 2-3 | 2 | 98/87/89 |
| Example 5 | 0.3 | 2 | 2 | 98/89/74 |
| | 0.7 | 3 | 2 | 98/89/77 |
| Example 6 | 0.3 | 2-3 | 3 | 98/87/88 |
| | 0.7 | 2-3 | 3 | 98/88/83 |

*1 = good leveling; 5 = poor leveling;
**1 = no craters; 5 = numerous craters

The gloss and the haze were measured using the "haze-gloss" instrument from Byk Gardner.

With the randomly branched copolymers of the invention it was possible to improve not only the leveling in comparison to the linear leveling agent structure (comparative example 3), but also the compatibility with the varnish, as manifested in lower haze values relative to the comparative examples.

4. Preparation of a White Powder Coating Material Composition:

| | | |
|---|---|---|
| Uralac P5127 | 28.5 g | Polyester resin, DSM |
| DER 663 UE | 28.5 g | Epoxy resin, Dow |
| Kronos 2160 | 28.5 g | Titanium dioxide, Kronos |
| Blanc fixe | 14.2 g | Barium sulfate, Sachtleben |
| Benzoin | 0.3 g | DSM |
| Leveling agent | 0.15 g | As per table below, calculated relative to the solids of the respective leveling agent |

The leveling agents from the examples were incorporated as 10% masterbatches in Uralac P5127. This was taken into account in the initial mass of Uralac P5127. All of the components were weighed in together and premixed in a high-speed mixer at 2000 rpm for 2.5 minutes. The mixtures were then extruded in a twin-screw extruder at 120° C. The resulting pieces were cooled, crushed, and ground in a pinned-disc mill. The resultant powder was passed through a 100 μm sieve.

The resulting powder coating mixture was then applied electrostatically to aluminum panels (size: 152 mm×76 mm, thickness 0.5 mm) and the panels thus coated were cured at 190° C. for 11 minutes.

Result:

| | Film thickness: | |
|---|---|---|
| Leveling agent: | 80-90 μm | 60-70 μm |
| Comparative 3 | 3 | 3 |
| Example 3 | 1 | 2 |
| Example 4 | 1 | 1 |

Evaluation of the surfaces produced:
1=crater-free surface
2=surface with slight craters
3=surface with distinct craters, in some cases down to the substrate 5. Preparation of a Powder Clearcoat Material Composition:

| | | |
|---|---|---|
| Uralac P865 | 94.1 g | Polyester resin, DSM |
| Primid XL-552 | 4.9 g | Hydroxyalkylamide crosslinker, EMS-Chemie |
| Benzoin | 0.5 g | DSM |
| Leveling agent | 0.5 g | |

The leveling agents from, the examples were incorporated as 10% masterbatches into the powder coating resin. This was taken into account in the initial mass of the resin. The masterbatch is produced, by melting the corresponding powder coating resin and mixing it with the leveling agent. After cooling, the masterbatch mixture is comminuted.

All of the components were weighed in together and. premixed in a Mixaco Lab CM3 high-speed mixer at 1500 rpm for 2.5 minutes. The mixtures were then extruded in a Prism TSE 16 twin-screw extruder at 120° C. The resulting resin melt was cooled, crushed, and ground in a Retsch ZM 100 pinned-disc mill. The resultant powder was passed through a 100 µm sieve.

The resulting powder coating mixture was then applied electrostatically to Q-panels A-36 aluminum panels, and the panels thus coated were cured in a forced-air oven at 180° C. for 14 minutes.

Evaluation of the resultant surface of the powder coatings:

The leveling was determined using the wave-scan DOI from BYK-Gardner, by measurements of the long wave and the short-wave.

Result:

| Leveling agent | Film thickness µm | Wave scan | |
|---|---|---|---|
| | | Long wave | Short wave |
| Comparative 3 | 40-50 | 33 | 29 |
| Comparative 4 | 50-60 | 30 | 23 |
| Example 5 | 50-60 | 22 | 21 |

The results show that better results are achieved when using the inventive polymer (example 5) as leveling agent.

The invention claimed is:

1. A process for preparing a randomly branched copolymer, wherein the components
   (a) 10-98.9 mol % of at least one acrylic ester of a linear, branched or cyclic $C_1$-$C_{22}$ alkyl monoalcohol,
   (b) 0.1-10 mol % of at least one polyethylenically unsaturated monomer, and
   (c) optionally one or more monoethylenically unsaturated monomers which are different from acrylic esters of linear, branched or cyclic $C_1$-$C_{22}$ alkyl monoalcohols and from compounds of the formula (I), in the presence of
   (d) 1-10 mol % of at least one compound of the formula (I)

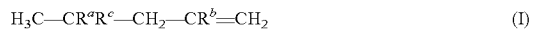

$$H_3C-CR^aR^c-CH_2-CR^b=CH_2 \quad (I)$$

where $R^a$ and $R^b$ independently of one another are aryl, CN or $COOR^1$ with $R^1$=H, alkyl, aryl or aralkyl and $R^c$=alkyl, aryl or aralkyl, and in the presence of at least one initiator of free-radical polymerization, are reacted in a free-radical polymerization, the stated molar fractions of components (a), (b), (c), and (d) adding up to 100 mol % and the molar fraction of component, (b) not exceeding the molar fraction of component (d).

2. The process of claim 1, wherein the molar fraction of component (a) is 40-98.8 mol %.

3. The process of claim 1, wherein the molar fraction of component (b) is 0.1-5 mol %.

4. The process of claim 1 wherein the molar fraction of component (c) is 0.1-50 mol %.

5. The process of claim 1, wherein the molar fraction of component (d) is 1-5 mol %.

6. The process of claim 1, wherein 2,4-diphenyl-4-methylpent-1-ene is used in component (d).

7. A randomly branched copolymer obtained by the process of claim 1.

8. The copolymer of claim 7, wherein the number-average molecular weight of the copolymer is 1500-200 000 g/mol.

9. A coating material corn rising a reveling agent comprising the copolymer of claim 7.

10. The coating material of claim 9, wherein the copolymer is used in the coating material in a fraction of 0.01%-5% by weight based on the total coating material.

11. The coating material of claim 9, wherein the coating material is a powder coating material, 12. A coating material comprising at least one copolymer of claim 7.

13. The coating material of claim 12, wherein the coating material is a powder coating material.

14. A leveling agent for a coating material, comprising at least one copolymer of claim 7.

* * * * *